US010402112B1

(12) United States Patent
Li (10) Patent No.: US 10,402,112 B1
(45) Date of Patent: Sep. 3, 2019

(54) METHOD AND SYSTEM FOR CHUNK-WIDE DATA ORGANIZATION AND PLACEMENT WITH REAL-TIME CALCULATION (71) Applicant: Alibaba Group Holding Limited, George Town, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 25 days.

(21) Appl. No.: 15/896,747

(22) Filed: Feb. 14, 2018

(51) Int. Cl.
G06F 12/00 (2006.01)
G06F 3/06 (2006.01)
G06F 16/13 (2019.01)

(52) U.S. Cl.
CPC .......... G06F 3/0643 (2013.01); G06F 3/0644 (2013.01); G06F 3/0664 (2013.01); G06F 16/13 (2019.01)

(58) Field of Classification Search
None
See application file for complete search history.

(56) References Cited

U.S. PATENT DOCUMENTS

| 4,775,932 | A | 10/1988 | Oxley |
| 6,226,650 | B1 | 5/2001 | Mahajan et al. |
| 7,565,454 | B2 | 7/2009 | Zuberi |
| 8,260,924 | B2 | 9/2012 | Koretz |
| 8,452,819 | B1 | 5/2013 | Sorenson, III |
| 8,516,284 | B2 | 8/2013 | Chan |
| 9,043,545 | B2 * | 5/2015 | Kimmel ................ G06F 3/0605 711/114 |
| 9,092,223 | B1 | 7/2015 | Pani |
| 9,588,977 | B1 * | 3/2017 | Wang ...................... G06F 16/13 |
| 2002/0010783 | A1 | 1/2002 | Primak |
| 2002/0161890 | A1 | 10/2002 | Chen |
| 2004/0010545 | A1 | 1/2004 | Pandya |
| 2004/0255171 | A1 | 12/2004 | Zimmer |

(Continued)

FOREIGN PATENT DOCUMENTS

| JP | 2003022209 | 1/2003 |
| JP | 2011175422 | 9/2011 |
| WO | 1994018634 | 8/1994 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Primary Examiner — John A Lane
(74) Attorney, Agent, or Firm — Shun Yao; Park, Vaughan, Fleming & Dowler LLP (57) ABSTRACT One embodiment provides a system for facilitating data organization. The system receives a request which indicates a file to be read from a non-volatile storage, which is divided into a plurality of logical chunks, wherein a chunk is divided into a plurality of bulks. The system determines a chunk index, a first offset between a beginning of the file and a beginning of a chunk corresponding to the chunk index, and a requested length of the file. The system calculates a bulk index for the requested file based on the chunk index and the first offset. The system identifies a location in the non-volatile storage based on the bulk index. The system reads the requested file from the identified location in the non-volatile storage based on the requested length.

20 Claims, 10 Drawing Sheets (56) References Cited

U.S. PATENT DOCUMENTS

| | | |
|---|---|---|
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0235171 A1 | 10/2005 | Igari |
| 2006/0156012 A1 | 7/2006 | Beeson |
| 2007/0033323 A1 | 2/2007 | Gorobets |
| 2009/0282275 A1 | 11/2009 | Yermalayeu |
| 2009/0307249 A1* | 12/2009 | Koifman ............... G06F 3/0623 |
| 2010/0229224 A1 | 9/2010 | Etchegoyen |
| 2010/0325367 A1 | 12/2010 | Kornegay |
| 2011/0055458 A1 | 3/2011 | Kuehne |
| 2011/0153903 A1 | 6/2011 | Hinkle |
| 2011/0218969 A1* | 9/2011 | Anglin ................ G06F 11/1453 707/679 |
| 2011/0231598 A1 | 9/2011 | Hatsuda |
| 2011/0292538 A1 | 12/2011 | Haga |
| 2011/0302353 A1 | 12/2011 | Confalonieri |
| 2012/0084523 A1* | 4/2012 | Littlefield ........... G06F 11/1469 711/162 |
| 2012/0117399 A1 | 5/2012 | Chan |
| 2012/0246392 A1 | 9/2012 | Cheon |
| 2013/0073798 A1 | 3/2013 | Kang |
| 2013/0145085 A1 | 6/2013 | Yu |
| 2013/0145089 A1 | 6/2013 | Eleftheriou |
| 2013/0159251 A1 | 6/2013 | Skrenta |
| 2013/0166820 A1 | 6/2013 | Batwara |
| 2013/0173845 A1 | 7/2013 | Aslam |
| 2013/0318283 A1 | 11/2013 | Small |
| 2014/0108414 A1* | 4/2014 | Stillerman ............... G06F 16/00 707/741 |
| 2014/0233950 A1 | 8/2014 | Luo |
| 2014/0250259 A1 | 9/2014 | Ke |
| 2014/0310574 A1 | 10/2014 | Yu |
| 2014/0359229 A1 | 12/2014 | Cota-Robles |
| 2014/0365707 A1 | 12/2014 | Talagala |
| 2015/0082317 A1 | 3/2015 | You |
| 2015/0106556 A1 | 4/2015 | Yu |
| 2015/0142752 A1 | 5/2015 | Chennamsetty |
| 2015/0372597 A1 | 12/2015 | Luo |
| 2016/0098344 A1 | 4/2016 | Gorobets |
| 2016/0110254 A1 | 4/2016 | Cronie |
| 2016/0232103 A1 | 8/2016 | Schmisseur |
| 2016/0239074 A1 | 8/2016 | Lee |
| 2016/0239380 A1 | 8/2016 | Wideman |
| 2016/0343429 A1 | 11/2016 | Nieuwejaar |
| 2016/0350002 A1 | 12/2016 | Vergis |
| 2017/0168986 A1 | 6/2017 | Sajeepa |
| 2017/0353576 A1 | 12/2017 | Guim Bernat |
| 2018/0024772 A1 | 1/2018 | Madraswala |
| 2018/0088867 A1 | 3/2018 | Kaminaga |

* cited by examiner

METHOD AND SYSTEM FOR CHUNK-WIDE DATA ORGANIZATION AND PLACEMENT WITH REAL-TIME CALCULATION

BACKGROUND

Field

This disclosure is generally related to the field of data storage. More specifically, this disclosure is related to a method and system for chunk-wise data organization and placement with real-time calculation.

Related Art

The proliferation of the Internet and e-commerce continues to create a vast amount of digital content. Distributed storage systems have been created to access and store such digital content. A distributed storage system can include multiple storage servers, where a storage server can include multiple drives, such as a solid state drive (SSD) and a hard disk drive (HDD). Data stored on a drive is typically organized based on a file system and a flash translation layer (FTL), which maps a logical block address (LBA) of data to a physical block address (PBA) of the drive. However, a significant discrepancy may exist between the size of a logical block and the size of a physical block. For example, an SSD/traditional file system can use a 512 B unit or a 4096 B (~4 KB) unit as the logical block size, but can use a 16 KB unit as the physical block size (e.g., as part of a physical page). As part of mapping an LBA to a PBA, the FTL maintains a look-up table, where every 4 KB LBA is assigned an entry which itself has an approximate size of 4 B. In an SSD with a 16 TB capacity, this FTL look-up table can have 4 billion entries (i.e., 16 TB/4 KB=4e+9). Given that each entry is 4 B, the FTL look-up table may be as large as 16 GB (i.e., 4e+9×4=16e+9).

This large 16 GB FTL look-up table may result in several issues. The table may be stored in non-volatile memory (e.g., NAND flash) to ensure the integrity of the content, but loading such a large table while powering up the drive may take a significant amount of time. The table may be stored in an off-chip DRAM of the SSD, but the SSD must install a 16 GB table to support a 16 TB capacity SSD. As the capacity of an SSD increases, so must the DRAM. Because the cost of DRAM can be high, the ensuing SSD cost can also be high.

Furthermore, the discrepancy between the logical block size (e.g., 4 KB) and the physical block size (e.g., 16 KB) can result in low efficiency and over-design. The generation and storage of the corresponding and necessary meta-data based on the small granularity of the logical size (4 KB) can result in a sub-optimal utilization of the capacity of a drive. For example, handling the meta-data may result in a non-trivial overhead and storing the meta-data may use a significant amount of memory capacity.

Thus, while a distributed storage system can effectively store a vast amount of data, the shortcomings of traditional SSDs and file systems can decrease the efficiency and overall performance of the system.

SUMMARY

One embodiment facilitates data organization. During operation, the system receives a request which indicates a file to be read from a non-volatile storage, wherein the non-volatile storage is divided into a plurality of logical chunks, and wherein a chunk is divided into a plurality of bulks. The system determines a chunk index, a first offset between a beginning of the file and a beginning of a chunk corresponding to the chunk index, and a requested length of the file based on the request. The system calculates a bulk index for the requested file based on the chunk index and the first offset. The system identifies a location in the non-volatile storage based on the bulk index. The system reads the requested file from the identified location in the non-volatile storage based on the requested length.

In some embodiments, the system determines, based on the request, a second offset between the beginning of the file and a starting location within the file from which to begin reading the file, wherein calculating the bulk index and identifying the location are further based on the second offset.

In some embodiments, determining the chunk index is further based on performing a lookup in a data structure based on the requested file. The data structure includes a mapping between the file and a set of corresponding location information. The location information includes a chunk index and a bulk index of the storage in the non-volatile storage.

In some embodiments, in response to successfully reading the requested file from the identified location in the non-volatile storage, the system sends the requested file to a requesting host.

In some embodiments, the request is received by a first server and transmitted to a second server. The system determines path information which indicates one or more storage servers from which to read the requested file. In response to determining that the path information is not cached at the second server: the system retrieves, by the second server, the path information from a master node; and the system caches, by the second server, the path information. In response to determining that the path information is cached at the second server, the system determines, by the second server, one or more storage servers from which to read the requested file.

In some embodiments, in response to unsuccessfully reading the requested file from the identified location in the non-volatile storage, the system reads the requested file from a non-volatile storage associated with another storage server indicated in the path information.

In some embodiments, in response to unsuccessfully reading the requested file from a plurality of non-volatile storage associated with the storage servers indicated in the path information: the system reports a read failure to the first server; and the system reads the requested file from a backup.

Another embodiment facilitates data organization. During operation, the system receives a request which indicates a file to be written to a non-volatile storage, wherein the non-volatile storage is divided into a plurality of logical chunks, and wherein a chunk is divided into a plurality of bulks. The system determines that a first bulk associated with the file is successfully cached in a buffer. The system writes the first bulk to a location in the non-volatile storage, wherein multiple bulks are written sequentially in the non-volatile storage. The system stores in a data structure a mapping between the file and a set of corresponding location information, wherein the location information includes a chunk index and a bulk index of the non-volatile storage, without accessing a logical block address to physical block address mapping in a flash translation layer.

In some embodiments, the system divides the file into a first plurality of chunks to obtain corresponding meta-data, which indicates an index for each chunk and a length of the file.

In some embodiments, the system determines a storage server associated with the non-volatile storage to which the first bulk is written based on the path information.

In some embodiments, prior to determining that the first bulk is successfully cached in the buffer, the system caches, by the storage server, the first bulk in the buffer. The system caches a remainder of the data in the buffer in units of bulks. The system writes the remainder of the data to the non-volatile storage when a respective bulk unit in the buffer is full.

In some embodiments, in response to determining that a current chunk is not sealed, the system appends the file to an end of the current chunk starting from a current location of a write pointer. In response to determining that the current chunk is sealed, the system: opens a new chunk; sets the new chunk as the current chunk; and writes the file to the current chunk. The system writes meta-data associated with the file into the current chunk.

In some embodiments, the system seals the current chunk in response to one or more of: determining that there are no remaining files to write; and determining that the current chunk has been open for longer than a predetermined period of time. The system pads the current chunk in response to determining that the current chunk has remaining space and further in response to one or more of: determining that there are no remaining files to write; and determining that the current chunk has been open for longer than a predetermined amount of time.

In some embodiments, the request, the file, and the corresponding meta-data are transmitted by the first server to a second server, and further transmitted by the second server to a storage server associated with the non-volatile storage to which the first bulk is written.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of the challenges created due to the discrepancy between the size of a logical block and the size of a physical block when executing an input/output (I/O) request. The system also solves the inefficiencies created by a large FTL table and the table look-ups typically involved in executing an I/O request.

Data stored on a drive is typically organized based on a file system and a flash translation layer (FTL), which maps a logical block address (LBA) of data to a physical block address (PBA) of the drive. However, a significant discrepancy may exist between the size of a logical block (e.g., 512 B or 4096 B) and the size of a physical block (e.g., 16 KB). As part of mapping an LBA to a PBA, the FTL maintains a look-up table, where every 4 KB LBA is assigned an entry which itself has an approximate size of 4 B. In an SSD with a 16 TB capacity, this FTL look-up table can have 4 billion entries (i.e., 16 TB/4 KB=4e+9). Given that each entry is 4 B, the FTL look-up table may be as large as 16 GB (i.e., 4e+9×4=16e+9).

This large 16 GB FTL look-up table may result in several issues. The table may be stored in non-volatile memory (e.g., NAND flash) to ensure the integrity of the content, but loading such a large table while powering up the drive may take a significant amount of time. The table may be stored in an off-chip DRAM of the SSD, but the SSD must install a 16 GB table to support a 16 TB capacity SSD. As the capacity of an SSD increases, so must the DRAM. Because the cost of DRAM can be high, the ensuing SSD cost can also be high.

Furthermore, the discrepancy between the logical block size (e.g., 4 KB) and the physical block size (e.g., 16 KB) can result in low efficiency and over-design. The generation and storage of the corresponding and necessary meta-data based on the small granularity of the logical size (4 KB) can result in a sub-optimal utilization of the capacity of a drive. For example, handling the meta-data may result in a non-trivial overhead and storing the meta-data may use a significant amount of memory capacity. Thus, the shortcomings of traditional SSDs and file systems can decrease the efficiency and overall performance of the system.

The embodiments described herein provide a system which solves these shortcomings by performing a real-time calculation in executing I/O requests. The system can be part of a distributed storage system, in which the non-volatile storage may be customized to circumvent these aforementioned shortcomings of traditional SSDs and file systems. Examples of non-volatile storage (which is also known as non-volatile memory) include, but are not limited to: flash memory (e.g., a flash drive); read-only memory; magnetic computer storage devices (e.g., hard disk drives, solid state drives, floppy disks, and magnetic tapes); and optical disks.

In a write operation, the system can divide the data into multiple chunks, where a chunk is composed of multiple bulks. A chunk can have a size of, e.g., 64 MB, and a bulk can have a size of, e.g., 128 KB. The system can write data sequentially to a drive in units of bulks. The system can also store a mapping between the data to be written (e.g., a file) and the chunk index and bulk index of location of the written data in a flash drive (e.g., corresponding location information). This allows the system to write the data in the drive and store the data's location information without accessing an LBA to PBA mapping table in a flash translation layer. An exemplary write operation is described below in relation to FIGS. 4A-4D.

In a read operation, rather than universally dividing the storage of a drive into small blocks (e.g., 512 B or 4 KB, as in sectors in a traditional SSD), the system can use the chunk index, a file offset, a requested offset, and a requested length to read the data out. The file offset is the space between the beginning of the file and the beginning of a chunk corresponding to the chunk index. The requested offset is the space between the beginning of the file and a starting location within the file from which to begin reading the file (e.g., when the data requested by the user begins at a location in the file other than the beginning of the file). The requested length can cover the entire file, or can cover only a portion of the file. The system can read the data from the drive by performing a real-time calculation of a bulk index for the requested file based on the chunk index and the file offset (and the requested offset, if included). An exemplary read operation is described below in relation to FIGS. 5A-5B.

Thus, the embodiments described herein provide a system which improves the efficiency and performance of a storage system. By organizing data in a flash drive based on bulk units, and by storing location information (e.g., chunk index, bulk index, and offset) based on a bulk unit as a minimum, the system can eliminate the need for a large FTL table (e.g., which can typically include a 4 B entry for each 4 KB sector unit). The system can write the data in chunks and bulks to a flash drive, and store the location information needed to subsequently read the data by performing a real-time calculation to determine the location of the data. Thus, the system overcomes the inefficiencies created based on discrepancies between the logical block size (e.g., 4 KB) and the physical block size (e.g., 16 KB) by avoiding the FTL lookup. Furthermore, the system can reduce the overhead involved in storing data, the latency involved to access stored data, the cost of hardware, and the complexity of firmware on the drive.

Exemplary Environment and Network

Figure 1:
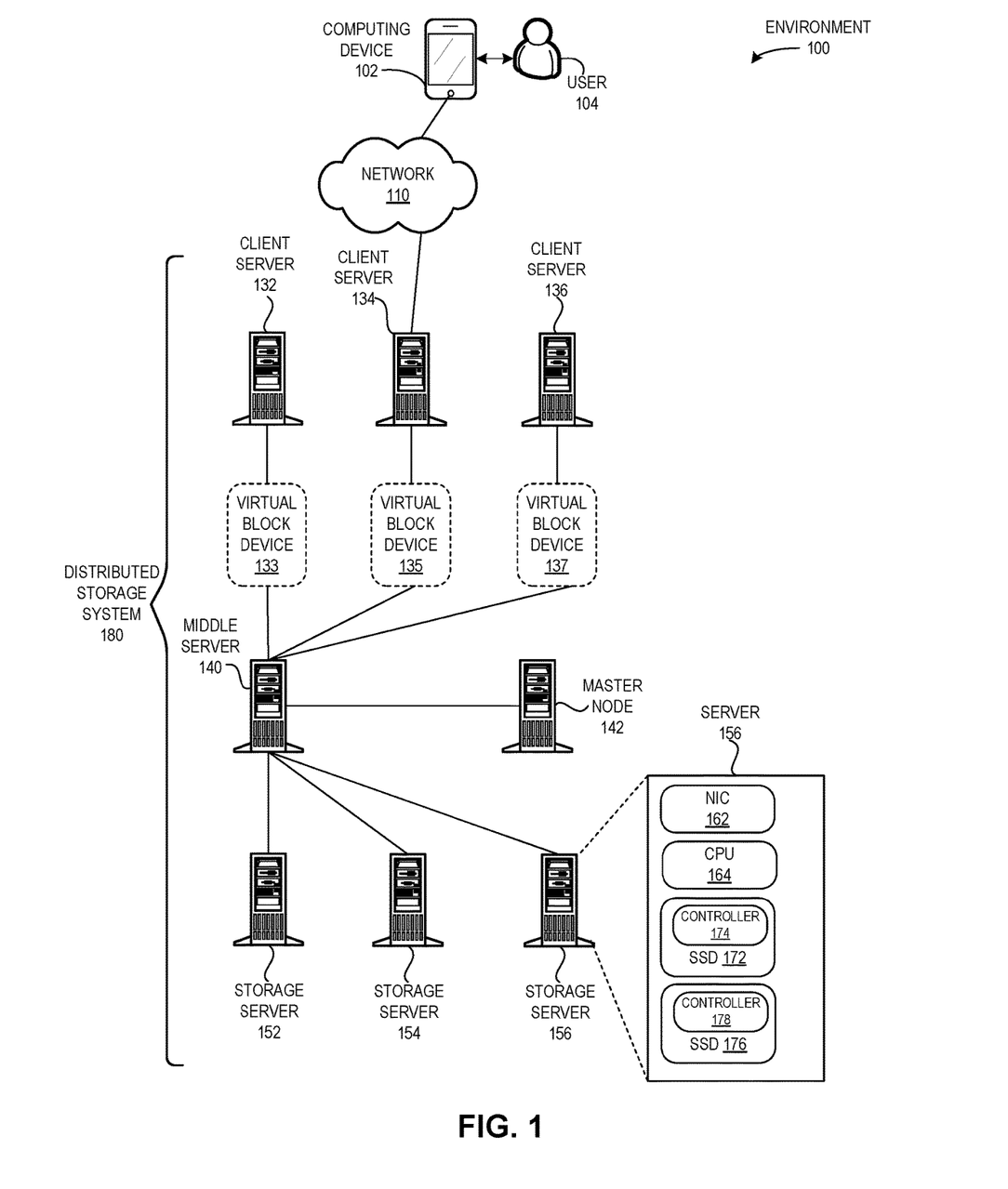
FIG. 1 illustrates an exemplary environment that facilitates chunk-wise data organization, in accordance with an embodiment of the present application.

FIG. 1 illustrates an exemplary environment 100 that facilitates chunk-wise data organization, in accordance with an embodiment of the present application. Environment 100 can include a computing device 102 and an associated user 104. Computing device 102 can communicate via a network 110 with distributed storage system 180, which can include: client servers 132, 134, and 136, which are each mapped, respectively, to a logical or a virtual block device 133, 135, and 137; a middle server 140; a master node 142; and storage servers 152, 154, and 156. Middle server 140 can handle incoming I/O requests from client servers 132-136 (received respectively via virtual block devices 133, 135, and 137). Data associated with incoming I/O requests is not held by client servers 132-136 or by corresponding virtual block devices 133-137. Instead of being accessed directly by client servers 132-136, master node 142 can communicate with the client servers as needed via middle server 140. Master node 142 can determine the path information, e.g., the locations of the multiple replicas at which to place/store the data or from which to read the data, while middle server 140 can cache the path information. Allowing middle server 140 to retrieve/cache the path information can result in a decreased overall latency and can also mitigate the burden of the master node.

A storage server can include multiple storage drives, and each drive can include a controller and multiple physical media for data storage. For example, storage server 156 can include: a network interface card (NIC) 162; a central processing unit (CPU) 164; an SSD 172 with a controller 174; and an SSD 176 with a controller 178. A virtual block device can be mapped to multiple drives based on the number of replicas. Incoming data is first organized or divided into logical "chunks," where a chunk can range in size from MB to tens of MBs (e.g., 64 MB). Each chunk is organized or divided into "bulks," where a bulk can be a unit with a size of 128 KB. Each bulk can be designed to be a multiple of a logical sector (e.g., 512 B or 4 KB).

Exemplary Chunk-Wise Data Organization

Figure 2:
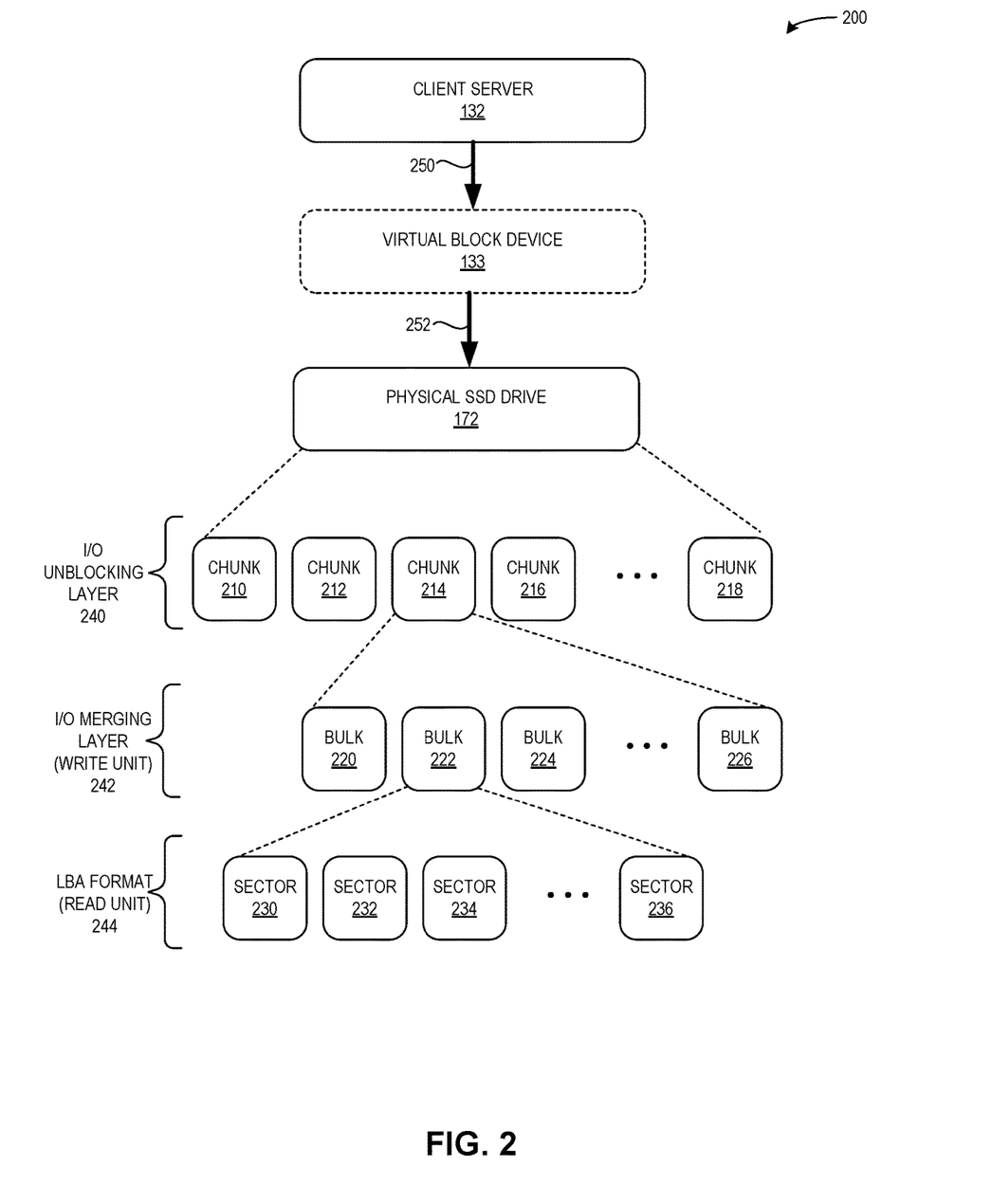
FIG. 2 illustrates an exemplary chunk-wise data organization in a drive, in accordance with an embodiment of the present application.

FIG. 2 illustrates an exemplary chunk-wise data organization 200 in a drive, in accordance with an embodiment of the present application. Data can pass from a client server 132 via a mapped virtual block device 133 to an SSD drive 172 (via communications 250 and 252). SSD drive 172 can include storage which is divided into logical chunks and bulks. The storage can include an I/O unblocking layer 240, which includes chunks 210-218, where a chunk can have a size of 64 MB. Each chunk can be divided into bulks, which can comprise an I/O merging layer 242 (which is the unit of data used for a write operation in the embodiments described herein). For example, chunk 214 can be divided into bulks 220-226, and I/O merging layer 242 can include bulks 220-226 and other bulks which comprise chunks 210-218. Each bulk can be divided into sectors, which can comprise an LBA format 244 (which is the unit of data used for a read operation in the embodiments described herein). For example, bulk 222 can be divided into sectors 230-236, and LBA format 244 can include sectors 230-236 and other sectors which comprise the bulks of I/O merging layer 242.

During a write operation, when data is received by client server 132, the system can transfer the data from client server 132 to a storage server which houses SSD drive 172 without blocking. Inside SSD drive 172, the physical storage media can perform the role of I/O merging layer 242. For example, SSD drive 172 (or the storage server which houses SSD 172) can buffer the incoming data to be written. When the size of the data accumulated in the buffer is greater than the size of a bulk, the system can sequentially write the data into physical SSD drive 172. If the size of the data accumulated in the buffer is less than the size of a bulk, the system can log the data, and wait until the size of the data in the buffer has reached the size of a bulk. Hence, the storage media of SSD 172 can be written based on a unit of a bulk, thus obviating the need to use the sector unit for write mapping.

During a read operation, the system can translate an incoming read request/file into a chunk index, an offset within the chunk ("a file offset"), and the requested length of the data to be read. The file offset can be a space between the beginning of the file and the beginning of a chunk corresponding to the chunk index. The incoming read request can also indicate a requested offset, which can be a space between the beginning of the file and a starting location within the file from which to begin reading the file (e.g., when the data requested to be read begins at a location in the file other than the beginning of the file). The requested length can cover the entire file or only a portion of the file.

A read operation can use these three parameters: the chunk index; the file offset; and the requested length. Based on these three parameters (and due to the sequential nature of the write operation), the system can perform a real-time calculation to determine the exact physical location of the requested data to be read and as stored on the physical storage media. If the read request indicates a requested offset, the read operation can also use the requested offset as a fourth parameter to execute the read operation.

While the middle level of bulk granularity can be used for a write operation, a read operation does not need to use this middle level of granularity, and thus also does not need to maintain a sector-wise mapping (e.g., does not need to maintain an FTL table with 4 B entries, where an entry corresponds to each 4 KB sector of the physical storage media).

Figure 3:
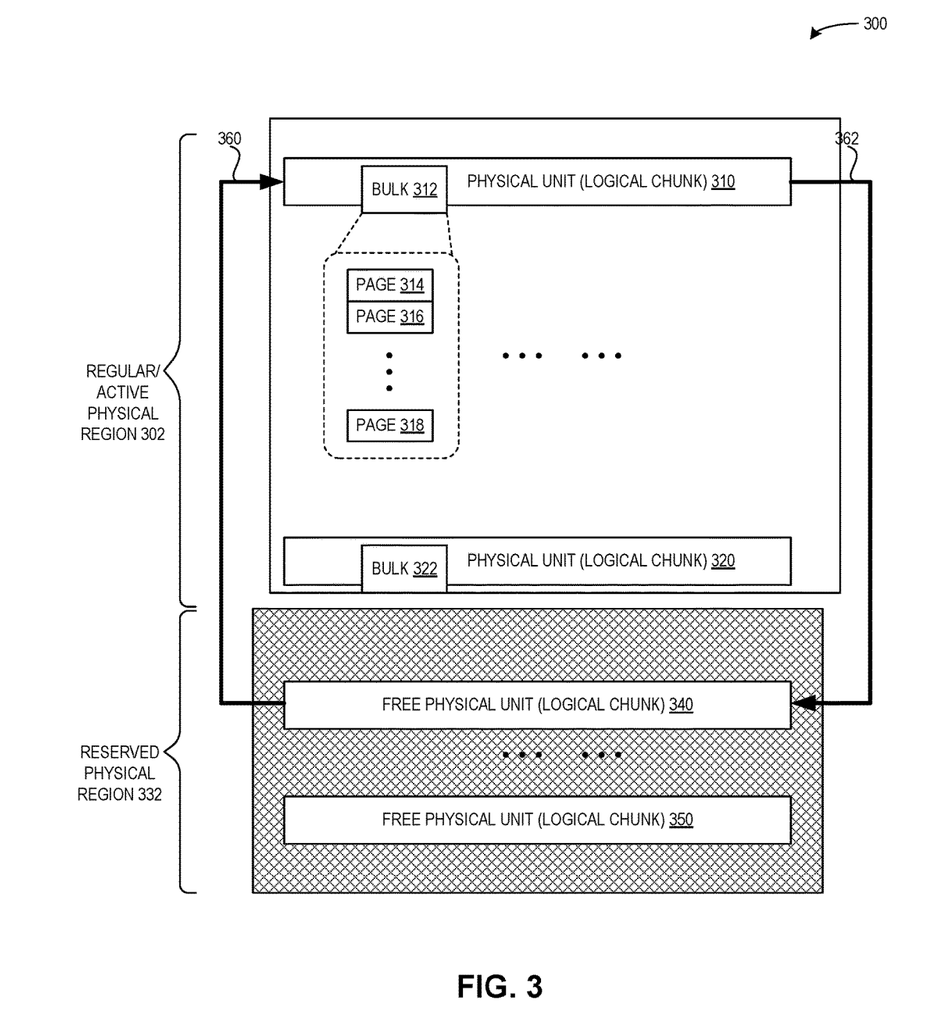
FIG. 3 illustrates an exemplary chunk-wise data organization in the physical space of a drive, in accordance with an embodiment of the present application.

FIG. 3 illustrates an exemplary chunk-wise data organization in the physical space 300 of a drive, in accordance with an embodiment of the present application. Physical space 300 can include a regular/active physical region 302 and a reserved physical region 332. Active region 302 can include physical units which each correspond to a logical chunk, where each physical unit (or represented logical chunk) can be divided into a plurality of bulks. Each bulk can be divided into a plurality of pages. For example, active region 302 can include a physical unit 310, which includes multiple bulks, such as a bulk 312. Bulk 312 can include a plurality of pages, such as pages 314, 316, and 318. Active region 302 can also include a physical unit 320 which includes multiple bulks, such as a bulk 322. Reserved physical region 332 can include free physical units 340 and 350.

Each chunk can correspond to or be mapped to a certain amount of a physical unit (e.g., a logical chunk of data can correspond to a physical unit with a size such as 64 MB). A respective storage server can store this mapping. In some embodiments, the middle server can also maintain this mapping, e.g., by caching the most recently used or accessed entries to ensure more efficient access by the system.

Incoming data can be placed into a currently open chunk or into a new chunk, depending upon the current position of the write pointer. As a result, incoming data is always treated as new data regardless of whether or not it is an update to existing data. The system can also perform the internal process of recycling on a chunk-wise basis. For example, when a chunk is marked for recycling, the system can copy the valid portions of data out and write those valid portions into a free chunk. That is, data which is ready to be recycled can be moved from an active physical unit to a reserved physical unit (e.g., as shown by a communication 362). A free physical unit from the reserved region can be opened and used as an active physical unit (e.g., as shown by a communication 360).

The system can also update a meta-data region by writing meta-data associated with a file to be written to or read from the drive. The system can further write hierarchical meta-data associated with the (cached) data in a bulk that is written to the drive. The system can pass the meta-data down to the drive and can also store the meta-data in the drive.

Method for Facilitating Chunk-Wise Data Organization (Write Operation)

Figure 4A:
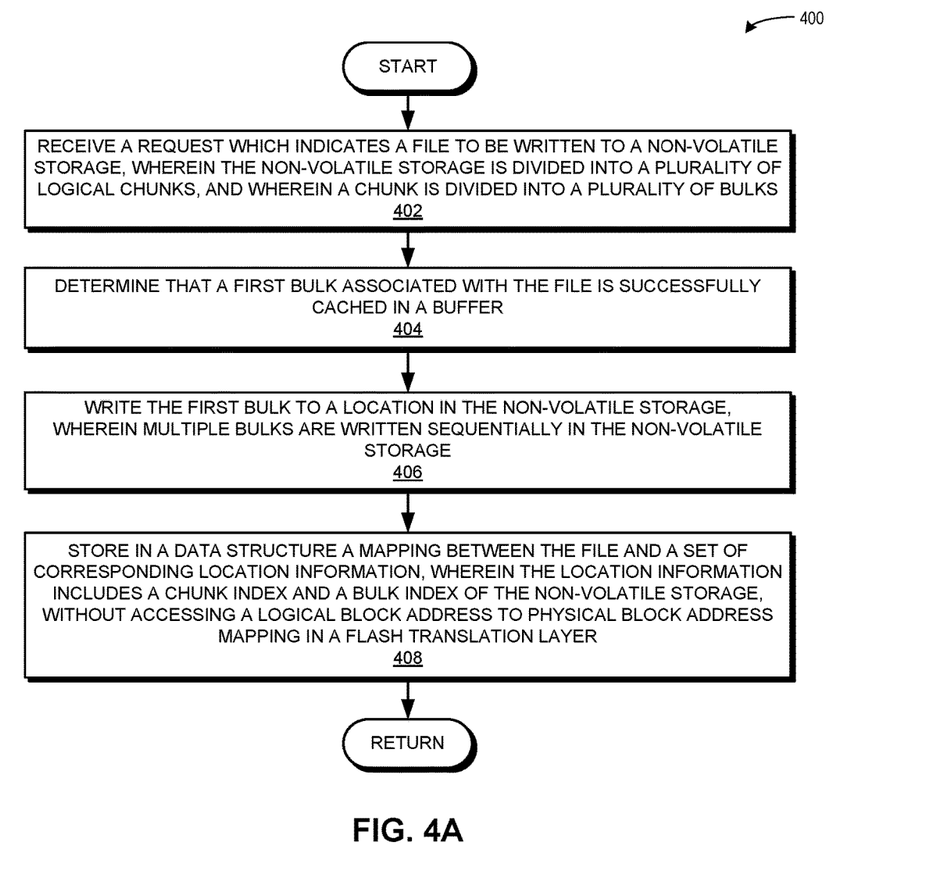
FIG. 4A presents a flowchart illustrating a method for writing data in a system which facilitates chunk-wise data organization, in accordance with an embodiment of the present application.

FIG. 4A presents a flowchart 400 illustrating a method for writing data in a system which facilitates chunk-wise data organization, in accordance with an embodiment of the present application. During operation, the system receives a request which indicates a file to be written to a non-volatile storage, wherein the non-volatile storage is divided into a plurality of logical chunks, and wherein a chunk is divided into a plurality of bulks (operation 402). As discussed above, the non-volatile storage can be, e.g., a flash drive or an SSD. The system determines that a first bulk associated with the file is successfully cached in a buffer (operation 404). The system writes the first bulk to a location in the non-volatile storage, wherein multiple bulks are written sequentially in the non-volatile storage (operation 406). The system stores in a data structure a mapping between the file and a set of corresponding location information, wherein the location information includes a chunk index and a bulk index of the storage in the non-volatile storage, without accessing a logical block address to physical block address mapping in a flash translation layer (operation 408).

Figure 4B:
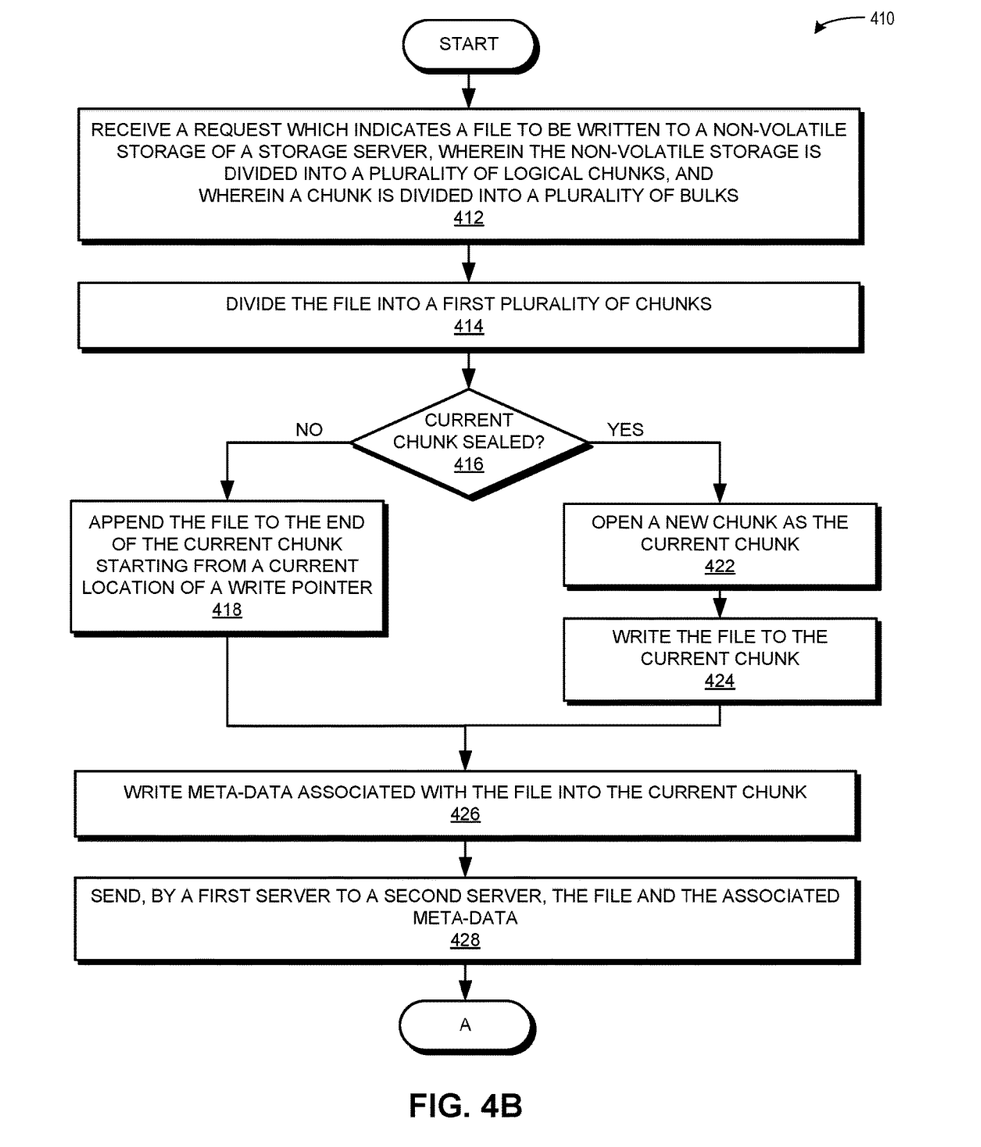
FIG. 4B presents a flowchart illustrating a method for writing data in a system which facilitates chunk-wise data organization, in accordance with an embodiment of the present application.

FIG. 4B presents a flowchart 410 illustrating a method for writing data in a system which facilitates chunk-wise data organization, in accordance with an embodiment of the present application. During operation, the system receives a request which indicates a file to be written to a non-volatile storage of a storage server, wherein the non-volatile storage is divided into a plurality of logical chunks, and wherein a chunk is divided into a plurality of bulks (operation 412). A storage server can include a plurality of non-volatile storage. The system divides the file into a first plurality of chunks (operation 414). The system can obtain corresponding meta-data for the file, which can indicate an index for each chunk and a length of the file. The system determines if a current chunk is sealed (decision 416). If it is not, the system appends the file to the end of the current chunk starting from a current location of a write pointer (operation 418). If the current chunk is sealed (decision 416), the system opens a new chunk as the current chunk (operation 422), and writes the file to the current chunk (operation 424). The system can also reset the write pointer. The system writes meta-data associated with the file into the current chunk (operation 426), and sends, by a first server to a second server, the file and the associated meta-data (operation 428). The operation continues as described at Label A of FIG. 4C.

Figure 4C:
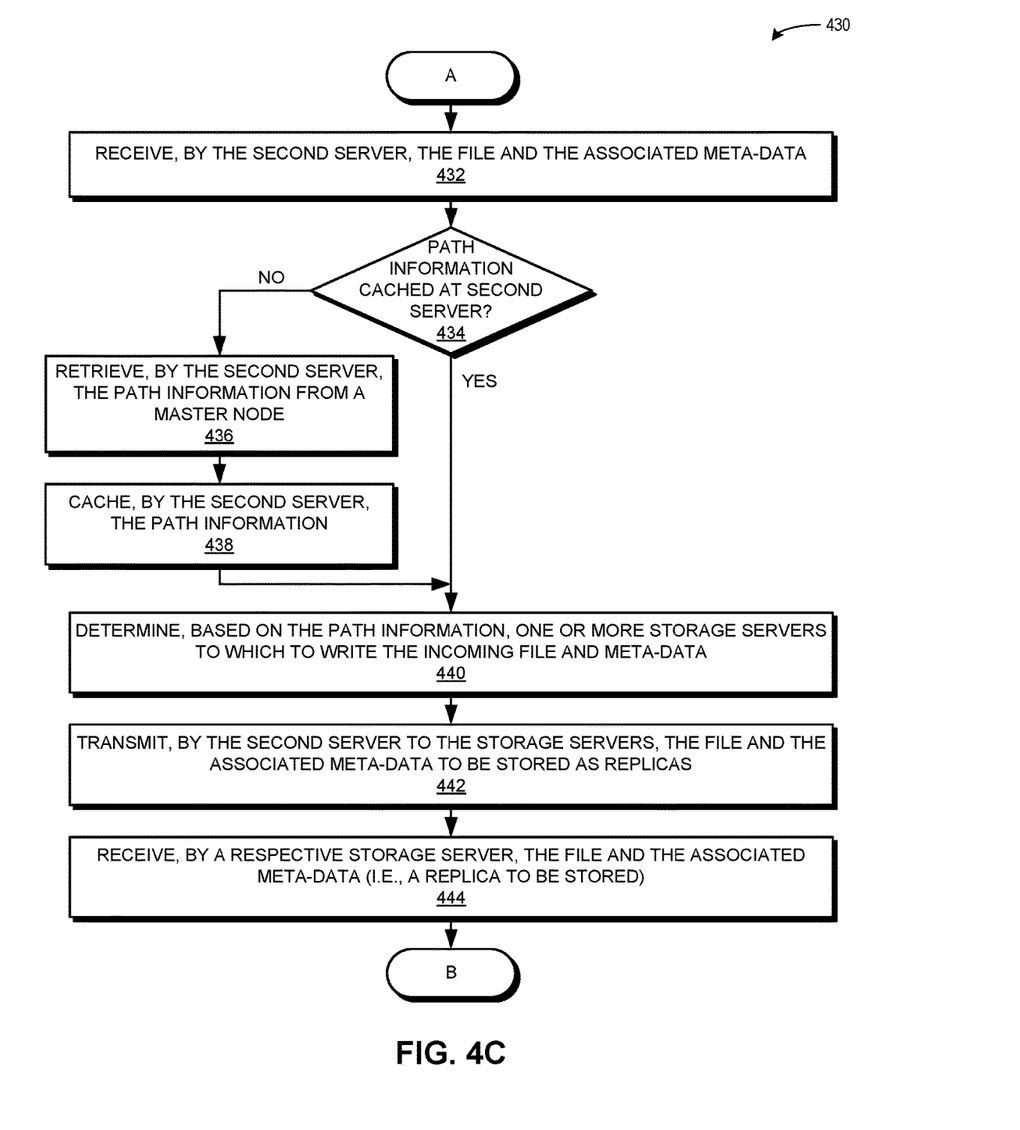
FIG. 4C presents a flowchart illustrating a method for writing data in a system which facilitates chunk-wise data organization, in accordance with an embodiment of the present application.

FIG. 4C presents a flowchart 430 illustrating a method for writing data in a system which facilitates chunk-wise data organization, in accordance with an embodiment of the present application. During operation, the system receives, by the second server, the file and the associated meta-data (operation 432). The system determines if path information is cached at the second server (decision 434). The path information can indicate one or more storage servers to which to write the file. If the path information is not cached at the second server (decision 434), the system retrieves, by the second server, the path information from a master node (operation 436). The system caches, by the second server, the path information (operation 438).

If the path information is cached at the second server (decision 434), the system determines, based on the path information, one or more storage servers to which to write the incoming file and meta-data (operation 440). The system transmits, by the second server to the storage servers, the file and the associated meta-data to be stored as replicas (operation 442). The system receives, by a respective storage server, the file and the associated meta-data (i.e., a replica to be stored) (operation 444), and the operation continues as described at Label B of FIG. 4D.

Figure 4D:
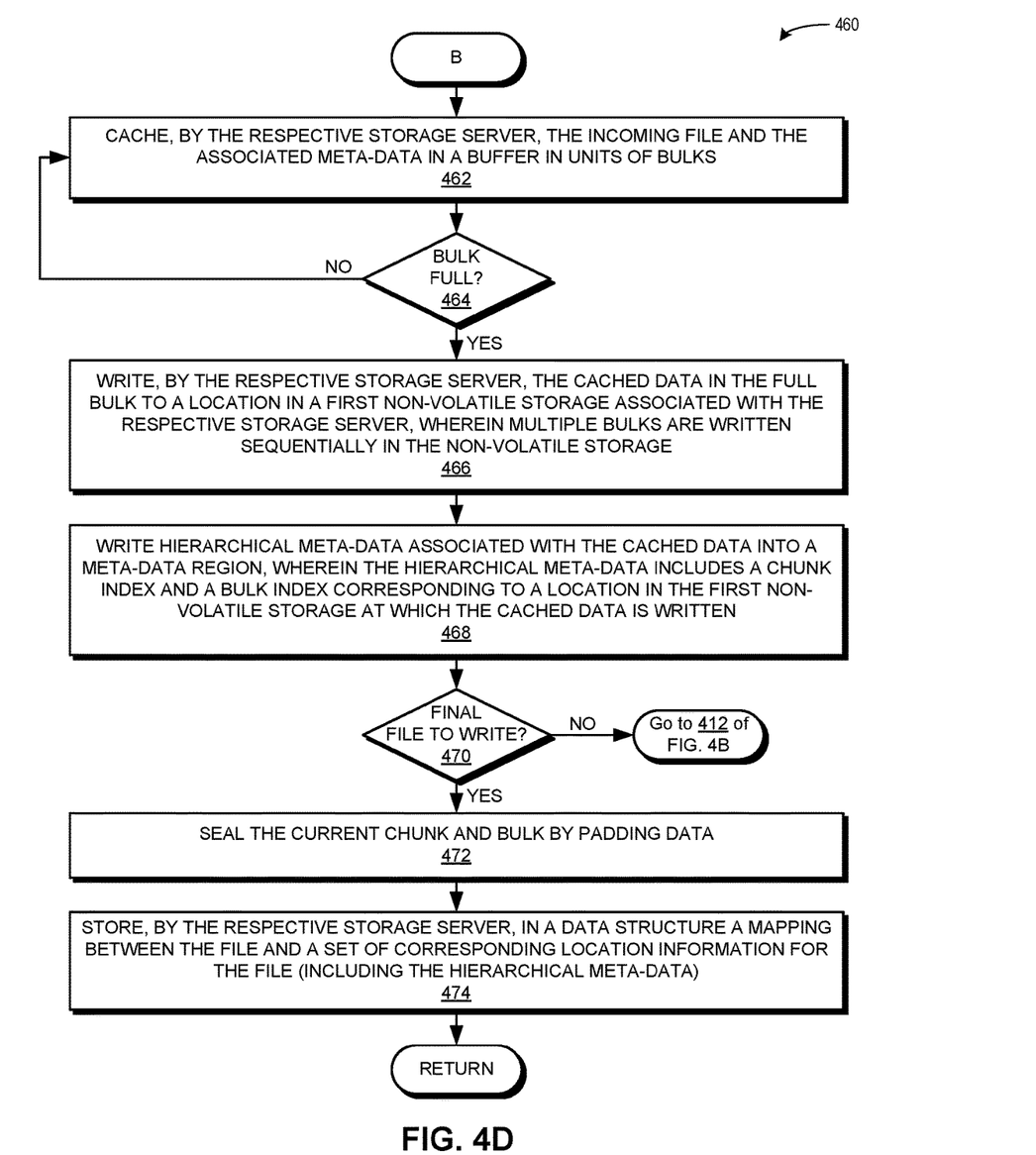
FIG. 4D presents a flowchart illustrating a method for writing data in a system which facilitates chunk-wise data organization, in accordance with an embodiment of the present application.

FIG. 4D presents a flowchart 460 illustrating a method for writing data in a system which facilitates chunk-wise data organization, in accordance with an embodiment of the present application. During operation, the system caches, by the respective storage server, the incoming file and the meta-data in a buffer in units of bulks (operation 462). When a bulk is full, the system writes the data to the non-volatile storage. For example, if a bulk is full (decision 464), the system writes, by the respective storage server, the cached data in the bulk to a location in a first non-volatile storage associated with the respective storage server, wherein multiple bulks are written sequentially in the non-volatile storage (operation 466). If the bulk is not full (decision 464), the system waits until the respective storage server has cached sufficient data to fill the buffer to the size of a bulk (e.g., operation 462). Recall that the non-volatile storage can be, e.g., a flash drive or an SSD. If a chunk or a bulk (as in decision 464) is open for more than a predetermined period of time, the drive can proactively seal the loop (e.g., by closing the chunk or bulk, or by writing data which is less than the size of a bulk to the drive).

Subsequently, the system writes hierarchical meta-data associated with the cached data into a meta-data region, wherein the hierarchical meta-data includes a chunk index and a bulk index corresponding to a location in the first non-volatile storage at which the cached data is written (operation 468). If the file is not the final file to write (decision 470), the operation returns to operation 412 of FIG. 4B. If the file is the final file to write (decision 470), the system seals the current chunk and bulk by padding data (operation 472). Note that if a chunk is open for greater than a predetermined period of time, the system can proactively seal the loop by closing the current chunk and padding data. The system stores, by the respective storage server, in a data structure a mapping between the file and a set of corresponding location information for the file (including the hierarchical meta-data) (operation 474). The data structure may be maintained by the storage server. In some embodiments, the data structure may also be maintained by the second server (e.g., middle server 140 of FIG. 1), such as a cached version of the most recently used or accessed entries to ensure more efficient access.

Method for Facilitating Chunk-Wise Data Organization (Read Operation)

Figure 5A:
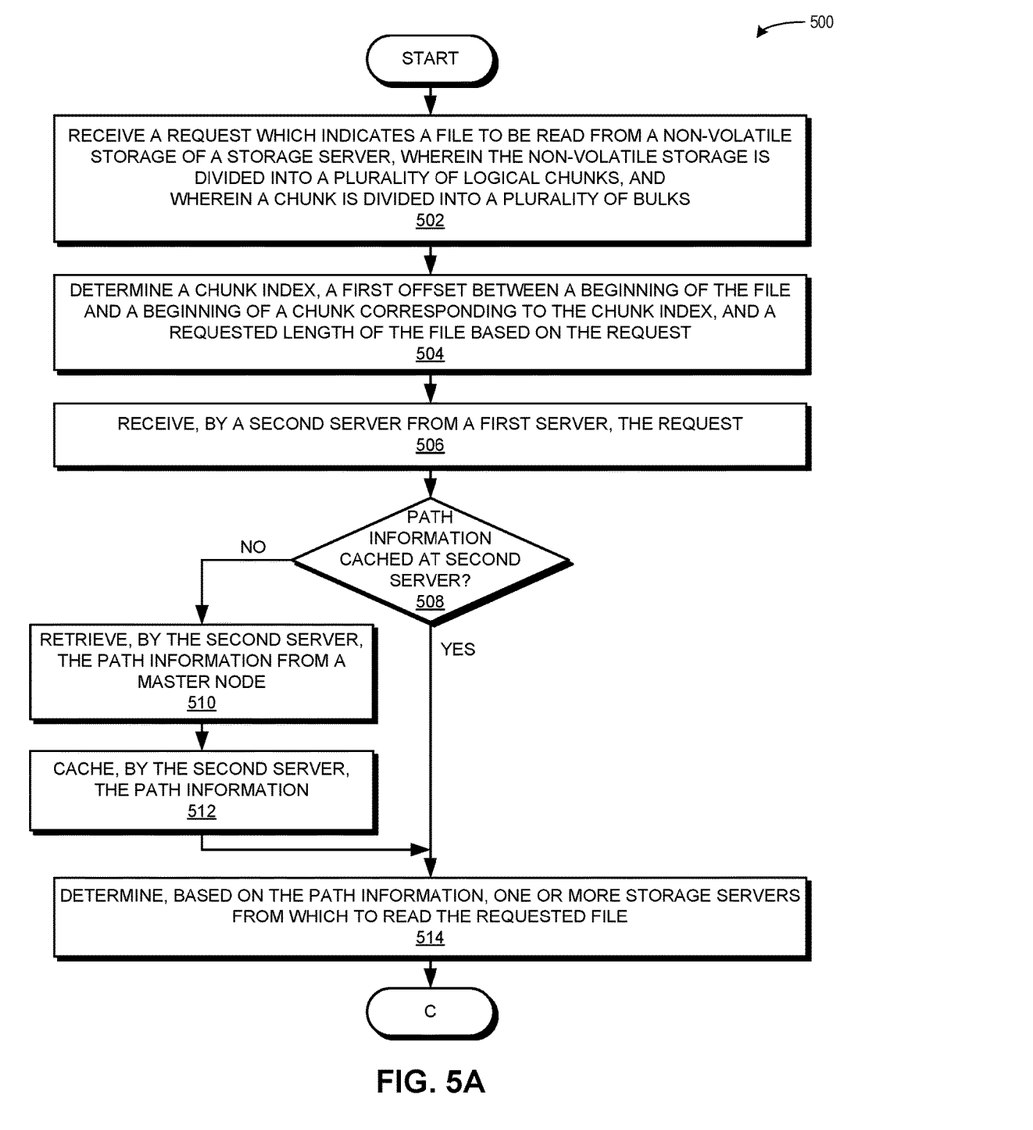
FIG. 5A presents a flowchart illustrating a method for reading data in a system which facilitates chunk-wise data organization, in accordance with an embodiment of the present application.

FIG. 5A presents a flowchart 500 illustrating a method for reading data in a system which facilitates chunk-wise data organization, in accordance with an embodiment of the present application. During operation, the system receives a request which indicates a file to be read from a non-volatile storage of a storage server, wherein the non-volatile storage is divided into a plurality of logical chunks, and wherein a chunk is divided into a plurality of bulks (operation 502). The system determines a chunk index, a first offset between a beginning of the file and a beginning of a chunk corresponding to the chunk index, and a requested length of the file based on the request (operation 504). The system can also determine a second offset indicated in the request, where the second offset is a space between the beginning of the file and a starting location within the file from which to read the file (e.g., when reading only a portion of the file) (not shown).

If the request indicates reading the entire file, the system can use the chunk index and the first offset to access the file, as described below. If the request indicates reading part of the file, the system can use the chunk index, the first offset, and the second offset to access the file. For example, the system can read out one physical page (e.g., 16 KB), and calculate the position of the first bit, and then read a number of bits from that point, where the number of bits is determined by the requested length.

The system receives, by a second server from a first server, the request (operation 506). The system determines if path information is cached at the second server (decision 508). The path information can indicate one or more storage servers to which to write the file. If the path information is not cached at the second server (decision 508), the system retrieves, by the second server, the path information from a master node (operation 510). The system caches, by the second server, the path information (operation 512).

Figure 5B:
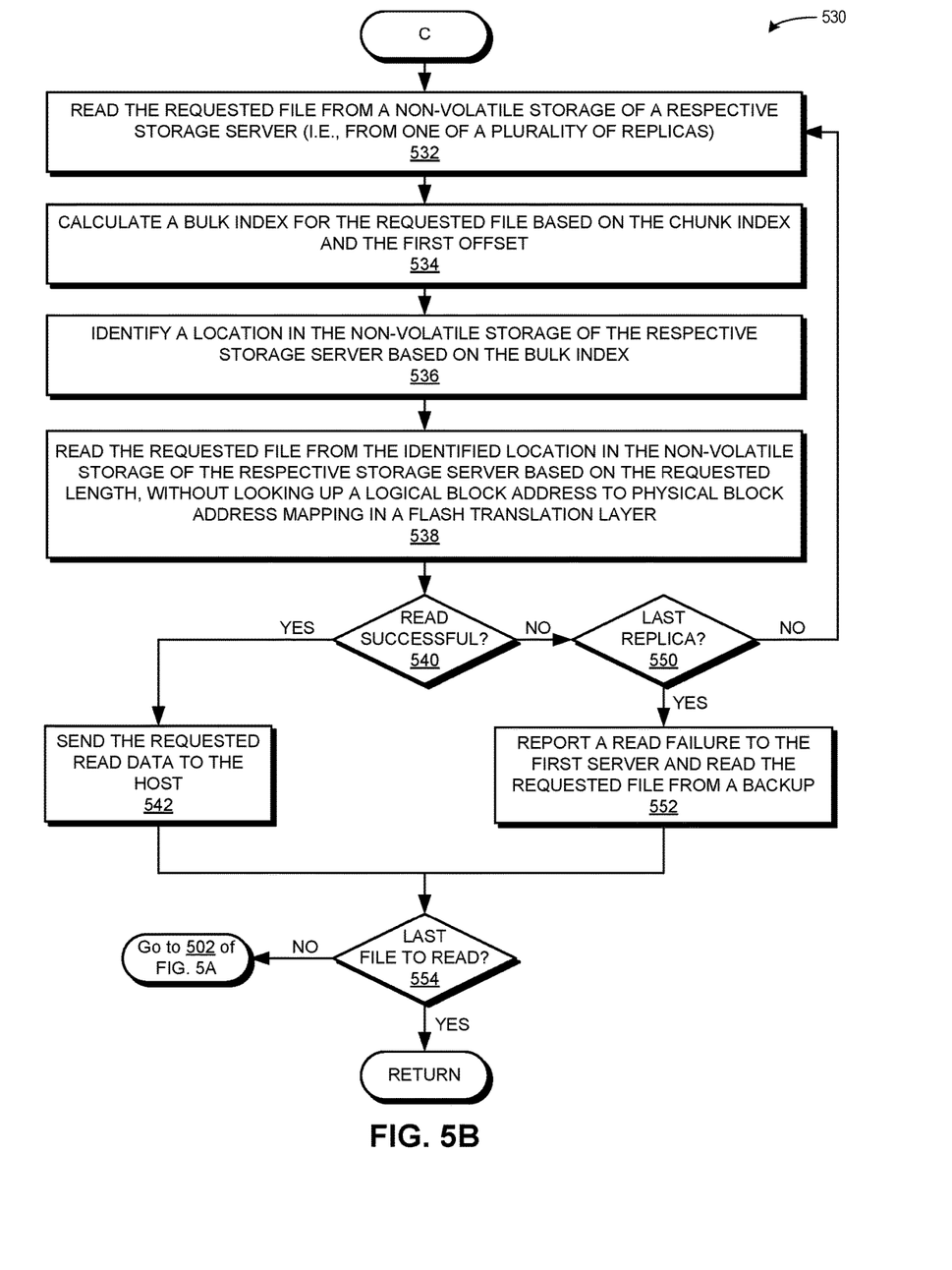
FIG. 5B presents a flowchart illustrating a method for reading data in a system which facilitates chunk-wise data organization, in accordance with an embodiment of the present application.

If the path information is cached at the second server (decision 508), the system determines, based on the path information, one or more storage servers from which to read the requested file (operation 512), and the operation continues as described at Label C of FIG. 5B.

FIG. 5B presents a flowchart 530 illustrating a method for reading data in a system which facilitates chunk-wise data organization, in accordance with an embodiment of the present application. During operation, the system reads the requested file from a non-volatile storage of a respective storage server (i.e., from one of a plurality of replicas) (operation 532). The system calculates a bulk index for the requested file based on the chunk index and the first offset (operation 534). The system identifies a location in the non-volatile storage of the respective storage server based on the bulk index (operation 536). The system can also calculate or determine a physical block address for the requested file based on the identified location. The location can correspond to the calculated bulk index and can be based on the chunk index and the calculated bulk index.

The system reads the requested file from the identified location in the non-volatile storage of the respective storage server based on the requested length, without looking up a logical block address to physical block address mapping in a flash translation layer (operation 538). If the read is successful (decision 540), the system sends the requested read data to a requesting host (operation 542).

If the read is not successful (decision 540), the system determines if this is the last replica (i.e., whether there are any remaining replicas) (decision 550). If this is not the last replica (i.e., there are remaining replicas) (decision 550), the operation returns to operation 532 (e.g., reading the requested file from another replica on another drive of the same or a different storage server based on the path information). If this is the last replica, the system reports a read failure to the first server and reads the requested file from a backup (operation 552). The system can read the data asynchronously from the backup.

If the requested file is not the last file to be read (decision 554), the operation continues at operation 502 of FIG. 5A. If the requested file is the last file to be read (decision 554), the operation returns.

Exemplary Computer System

Figure 6:
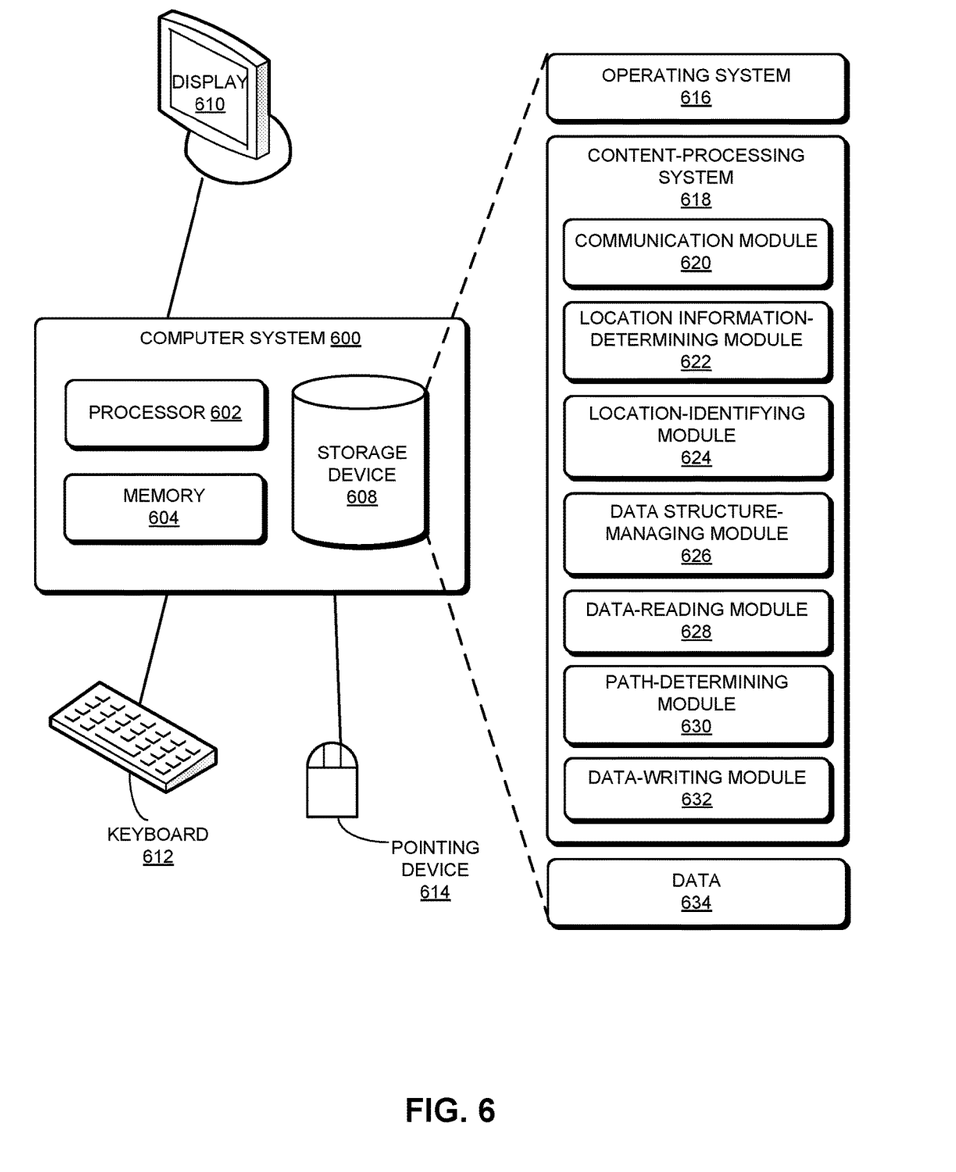
FIG. 6 illustrates an exemplary computer system that facilitates chunk-wise data organization, in accordance with an embodiment of the present application.

FIG. 6 illustrates an exemplary computer system 600 that facilitates chunk-wise data organization, in accordance with an embodiment of the present application. Computer system 600 includes a processor 602, a memory 604, and a storage device 608. Memory 604 can include volatile memory (e.g., RAM) that serves as a managed memory, and can be used to store one or more memory pools. Computer system 600 may be a computing device or a storage device. Furthermore, computer system 600 can be coupled to a display device 618, a keyboard 612, and a pointing device 614. Storage device 608 can store an operating system 616, a content-processing system 618, and data 634.

Content-processing system 618 can include instructions, which when executed by computer system 600, can cause computer system 600 to perform methods and/or processes described in this disclosure. For example, content-processing system 618 can include instructions for receiving and transmitting data packets, including a request which indicates a file to be read from or written to a non-volatile storage (e.g., a flash drive or an SSD), data to be encoded and stored, or a block or a page of data.

Content-processing system 618 can further include instructions for receiving a request which indicates a file to be read from a non-volatile storage, wherein the non-volatile storage is divided into a plurality of logical chunks, and wherein a chunk is divided into a plurality of bulks (communication module 620). Content-processing system 618 can include instructions for determining a chunk index, a first offset between a beginning of the file and a beginning of a chunk corresponding to the chunk index, and a requested length of the file based on the request (location information-determining module 622). Content-processing system 618 can also include instructions for calculating a bulk index for the requested file based on the chunk index and the first offset (location-identifying module 624). Content-processing system 618 can include instructions for identifying a location in the non-volatile storage based on the bulk index (location-identifying module 624). Content-processing system 618 can additionally include instructions for reading the requested file from the identified location in the non-volatile storage based on the requested length, without looking up a logical block address to physical block address mapping in a flash translation layer (data-reading module 628).

Content-processing system 618 can also include instructions for receiving a request which indicates a file to be written to a non-volatile storage (communication module 620). Content-processing system 618 can include instructions for determining that a first bulk associated with the file is successfully cached in a buffer (data-writing module 632). Content-processing system 618 can include instructions for writing the first bulk to a location in the non-volatile storage, wherein multiple bulks are written sequentially in the non-volatile storage (data-writing module 632). Content-processing system 618 can include instructions for storing in a data structure a mapping between the file and a set of corresponding location information, wherein the location information includes a chunk index and a bulk index of the non-volatile storage, without accessing a logical block address to physical block address mapping in a flash translation layer (data structure-managing module 626).

Content-processing system 618 can further include instructions for determining the chunk index based on performing a lookup in a data structure based on the requested file (data structure-managing module 626). Content-processing system 618 can include instructions for determining path information which indicates one or more storage servers from which to read or to which to write the requested file (path-determining module 630).

Data 634 can include any data that is required as input or that is generated as output by the methods and/or processes described in this disclosure. Specifically, data 634 can store at least: a request; a request indicating a file or data to be written to or read from a non-volatile storage; an I/O request; data to be stored, written, loaded, moved, retrieved, or copied; a chunk of data; a bulk of data; a sector of data; a page of data; a data structure; a mapping between a file and a set of corresponding location information; a logical chunk; a bulk; a chunk index; a first offset between a beginning of a file and a beginning of a chunk corresponding to a chunk index; a length of a file; a requested length of a file; a bulk index; a location in a non-volatile storage; a logical block address; a physical block address; a second offset between the beginning of a file and a starting location within the file from which to begin reading the file; path information which indicates one or more storage servers from which to read or to which to write a file; and a predetermined period of time.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data organization, the method comprising:

receiving a request which indicates a file to be read from a non-volatile storage, wherein the non-volatile storage is divided into a plurality of logical chunks, and wherein a chunk is divided into a plurality of bulks;

determining a chunk index, a first offset between a beginning of the file and a beginning of a chunk corresponding to the chunk index, and a requested length of the file based on the request;
calculating a bulk index for the requested file based on the chunk index and the first offset;
identifying a location in the non-volatile storage based on the bulk index; and
reading the requested file from the identified location in the non-volatile storage based on the requested length.

2. The method of claim 1, further comprising:
determining, based on the request, a second offset between the beginning of the file and a starting location within the file from which to begin reading the file,
wherein calculating the bulk index and identifying the location are further based on the second offset.

3. The method of claim 1, wherein determining the chunk index is further based on performing a lookup in a data structure based on the requested file,
wherein the data structure includes a mapping between the file and a set of corresponding location information, and wherein the location information includes a chunk index and a bulk index of the storage in the non-volatile storage.

4. The method of claim 1, further comprising:
in response to successfully reading the requested file from the identified location in the non-volatile storage, sending the requested file to a requesting host.

5. The method of claim 1, wherein the request is received by a first server and transmitted to a second server, and wherein the method further comprises:
determining path information which indicates one or more storage servers from which to read the requested file;
in response to determining that the path information is not cached at the second server:
retrieving, by the second server, the path information from a master node; and
caching, by the second server, the path information; and
in response to determining that the path information is cached at the second server, determining, by the second server, one or more storage servers from which to read the requested file.

6. The method of claim 5, further comprising:
in response to unsuccessfully reading the requested file from the identified location in the non-volatile storage, reading the requested file from a non-volatile storage associated with another storage server indicated in the path information.

7. The method of claim 5, further comprising:
in response to unsuccessfully reading the requested file from a plurality of non-volatile storage associated with the storage servers indicated in the path information:
reporting a read failure to the first server; and
reading the requested file from a backup.

8. A computer-implemented method for facilitating data organization, the method comprising:
receiving a request which indicates a file to be written to a non-volatile storage, wherein the non-volatile storage is divided into a plurality of logical chunks, and wherein a chunk is divided into a plurality of bulks;
determining that a first bulk associated with the file is successfully cached in a buffer;
writing the first bulk to a location in the non-volatile storage, wherein multiple bulks are written sequentially in the non-volatile storage; and
storing in a data structure a mapping between the file and a set of corresponding location information, wherein the location information includes a chunk index and a bulk index of the non-volatile storage.

9. The method of claim 8, further comprising:
dividing the file into a first plurality of chunks to obtain corresponding meta-data, which indicates an index for each chunk and a length of the file.

10. The method of claim 9, wherein the request, the file, and the corresponding meta-data are transmitted by the first server to a second server, and further transmitted by the second server to a storage server associated with the non-volatile storage to which the first bulk is written.

11. The method of claim 8, wherein the request is received by a first server and transmitted to a second server, and wherein the method further comprises:
determining path information which indicates one or more storage servers to which to write the file;
in response to determining that the path information is not cached at the second server:
retrieving, by the second server, the path information from a master node; and
caching, by the second server, the path information; and
in response to determining that the path information is cached at the second server, determining, by the second server, one or more storage servers to which to write the file.

12. The method of claim 11, further comprising:
determining a storage server associated with the non-volatile storage to which the first bulk is written based on the path information.

13. The method of claim 12, further comprising:
prior to determining that the first bulk is successfully cached in the buffer, caching, by the storage server, the first bulk in the buffer;
caching a remainder of the data in the buffer in units of bulks; and
writing the remainder of the data to the non-volatile storage when a respective bulk unit in the buffer is full.

14. The method of claim 8, further comprising:
in response to determining that a current chunk is not sealed, appending the file to an end of the current chunk starting from a current location of a write pointer;
in response to determining that the current chunk is sealed:
opening a new chunk;
setting the new chunk as the current chunk; and
writing the file to the current chunk; and
writing meta-data associated with the file into the current chunk.

15. The method of claim 14, further comprising:
sealing the current chunk in response to one or more of:
determining that there are no remaining files to write; and
determining that the current chunk has been open for longer than a predetermined period of time; and
padding the current chunk in response to determining that the current chunk has remaining space and further in response to one or more of:
determining that there are no remaining files to write; and
determining that the current chunk has been open for longer than a predetermined amount of time.

16. A computer system for facilitating data organization, the system comprising:
a processor; and
a memory coupled to the processor and storing instructions, which when executed by the processor cause the processor to perform a method, the method comprising:

receiving a first request which indicates a first file to be read from a non-volatile storage, wherein the non-volatile storage is divided into a plurality of logical chunks, and wherein a chunk is divided into a plurality of bulks;

determining a chunk index, a first offset between a beginning of the first file and a beginning of a chunk corresponding to the chunk index, and a requested length of the first file based on the first request;

calculating a bulk index for the first file based on the chunk index and the first offset;

identifying a first location in the non-volatile storage based on the bulk index; and reading the first file from the first location in the non-volatile storage based on the requested length.

17. The computer system of claim 16, further comprising:

determining, based on the first request, a second offset between the beginning of the first file and a starting location within the first file from which to begin reading the first file, wherein calculating the bulk index and identifying the first location are further based on the requested offset.

18. The computer system of claim 16, further comprising:

determining path information which indicates one or more storage servers from which to read the first file.

19. The computer system of claim 16, further comprising:

receiving a second request which indicates a second file to be written to the non-volatile storage;

determining that a first bulk associated with the second file is successfully cached in a buffer;

writing the first bulk to a second location in the non-volatile storage, wherein multiple bulks are written sequentially in the non-volatile storage; and storing in a data structure a mapping between the second file and a set of corresponding location information, wherein the location information includes a chunk index and a bulk index of the non-volatile storage.

20. The computer system of claim 19, further comprising:

prior to determining that the first bulk is successfully cached in the buffer, caching the first bulk in the buffer;

caching a remainder of the data in the buffer in units of bulks; and writing the remainder of the data to the non-volatile storage when a respective bulk unit in the buffer is full.

\* \* \* \* \*

UNITED STATES PATENT AND TRADEMARK OFFICE
CERTIFICATE OF CORRECTION

| | | |
|---|---|---|
| PATENT NO. | : 10,402,112 B1 | Page 1 of 1 |
| APPLICATION NO. | : 15/896747 | |
| DATED | : September 3, 2019 | |
| INVENTOR(S) | : Shu Li | |

It is certified that error appears in the above-identified patent and that said Letters Patent is hereby corrected as shown below:

On the Title Page

Item (54) and in the Specification, Column 1 Lines 1-3 Title should read:
"METHOD AND SYSTEM FOR CHUNK-WISE DATA ORGANIZATION AND PLACEMENT WITH REAL-TIME CALCULATION"

Signed and Sealed this
Third Day of December, 2019

Andrei Iancu
*Director of the United States Patent and Trademark Office*